(12) United States Patent
Garcia et al.

(10) Patent No.: US 11,565,478 B2
(45) Date of Patent: *Jan. 31, 2023

(54) DEFINITION OF A SHIELD FEATURE FOR ADDITIVE MANUFACTURE

(71) Applicant: HEWLETT-PACKARD DEVELOPMENT COMPANY, L.P., Spring, TX (US)

(72) Inventors: Luis Garcia, Sant Cugat del Valles (ES); Pol Fornos, Sant Cugat del Valles (ES); David Ramirez Muela, Sant Cugat del Valles (ES)

(73) Assignee: Hewlett-Packard Development Company, L.P., Spring, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/147,687

(22) Filed: Jan. 13, 2021

(65) Prior Publication Data

US 2021/0129446 A1  May 6, 2021

Related U.S. Application Data

(63) Continuation of application No. 16/064,584, filed as application No. PCT/EP2016/057372 on Apr. 4, 2016, now Pat. No. 10,919,228.

(51) Int. Cl.
*B29C 64/165* (2017.01)
*B29C 64/393* (2017.01)
(Continued)

(52) U.S. Cl.
CPC .......... *B29C 64/393* (2017.08); *B29C 64/165* (2017.08); *B33Y 10/00* (2014.12); *B33Y 30/00* (2014.12); *B33Y 50/02* (2014.12)

(58) Field of Classification Search
CPC .................................................. B29C 64/165
See application file for complete search history.

(56) References Cited

U.S. PATENT DOCUMENTS 6,147,138 A * 11/2000 Hochsmann ........... B33Y 10/00
523/149
9,114,571 B2   8/2015 You
(Continued)

FOREIGN PATENT DOCUMENTS

CN         103747943 A    4/2014
WO    WO-2004009489 A2   1/2004
(Continued)

OTHER PUBLICATIONS

Mohanty, et al; "Fabrication of Scalable and Structured Tissue Engineering Scaffolds Using Water Dissolvable Sacrificial 3D Printed Moulds"; Oct. 1, 2015; http://www.sciencedirect.com/science/article/pii/S092849311530134X.

*Primary Examiner* — Cachet I Proctor
(74) *Attorney, Agent, or Firm* — Michael Dryja

(57) ABSTRACT

There is disclosed additive manufacturing apparatus comprising: a controller to: receive object data relating to an object to be generated; and define print data for additive manufacture of the object by ejection of a print agent on build material in a pattern corresponding to selective fusing of the build material, wherein the print data is defined based on the object data so that the pattern defines a shield feature embedded within the object to inhibit fusing of build material corresponding to the shield feature relative build material corresponding to an adjacent portion of the object; and a print agent distributor to eject a print agent on build material based on the print data.

20 Claims, 10 Drawing Sheets

(51) Int. Cl.
    *B33Y 10/00*     (2015.01)
    *B33Y 30/00*     (2015.01)
    *B33Y 50/02*     (2015.01)

(56) References Cited

U.S. PATENT DOCUMENTS

| | | | |
|---|---|---|---|
| 2006/0180957 A1* | 8/2006 | Hopkinson | B29C 67/02 |
| | | | 264/405 |
| 2007/0241482 A1* | 10/2007 | Giller | B29C 64/165 |
| | | | 264/494 |
| 2011/0076438 A1 | 3/2011 | Farr | |
| 2014/0271961 A1* | 9/2014 | Khoshnevis | C04B 35/6303 |
| | | | 425/375 |
| 2015/0306664 A1 | 10/2015 | Klint | |
| 2017/0326799 A1 | 11/2017 | Ng | |

FOREIGN PATENT DOCUMENTS

| | | | | |
|---|---|---|---|---|
| WO | WO-2015106844 A1 | | 7/2015 | |
| WO | WO-2015108554 A1 * | | 7/2015 | B29C 64/00 |
| WO | WO-2015108556 A1 * | | 7/2015 | B29C 67/0051 |
| WO | WO-2015167520 A1 | | 11/2015 | |

* cited by examiner

DEFINITION OF A SHIELD FEATURE FOR ADDITIVE MANUFACTURE

BACKGROUND

Additive manufacturing systems that generate three-dimensional objects on a layer-by-layer basis have been proposed as a potentially convenient way to produce three-dimensional objects.

Three-dimensional objects generated by an additive manufacturing process may be formed in a layer-by-layer manner. In one example of additive manufacturing, an object is generated by solidifying portions of layers of build material. In some examples, the build material may be in the form of a powder.

In some such processes, energy may be applied to a build material. For example, energy may be applied to preheat the build material to a temperature which is close to its melting point. Energy may also be applied to cause melting, so that regions of the build material may fuse to form portions of an object.

BRIEF DESCRIPTION OF DRAWINGS

Examples will now be described, by way of non-limiting example, with reference to the accompanying drawings, in which.

DETAILED DESCRIPTION

Figure 1:
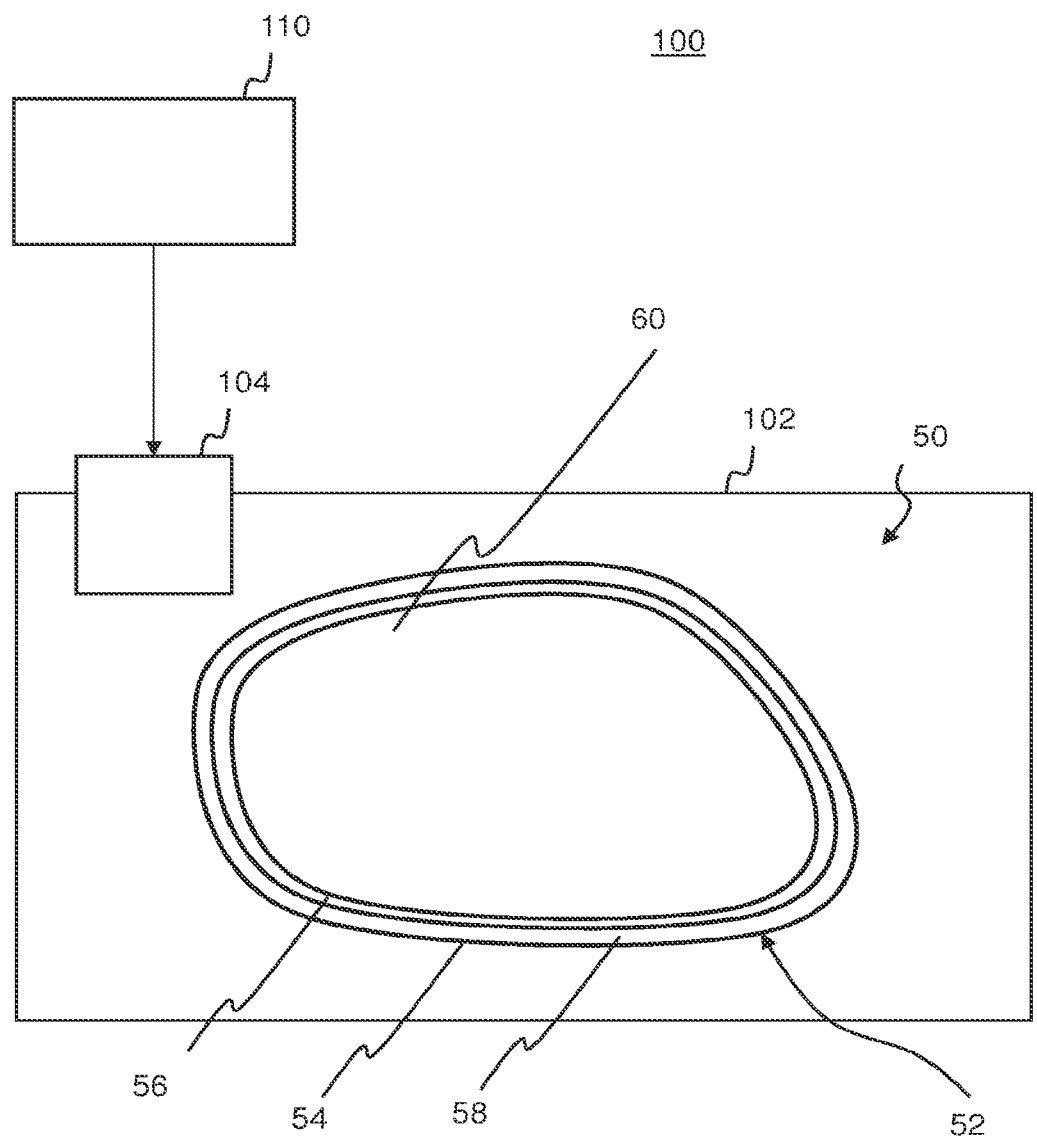
FIG. 1 is a simplified schematic view of an example additive manufacturing apparatus.

Additive manufacturing techniques may generate a three-dimensional object through the solidification (or fusing) of a build material. In one example the build material may be powder-based and the properties of generated objects may depend on the type of build material and the type of solidification mechanism used. In a number of examples of such techniques including sintering and fusing techniques, build material is supplied in a layer-wise manner and the solidification method includes heating the layers of build material to cause fusing (melting) in selected regions. In other techniques, chemical solidification methods may be used.

In example additive manufacturing techniques, a fusing agent (also known as a coalescent agent) may be selectively ejected onto build material, for example using a print agent distributor such as an inkjet print head. The fusing agent may be capable of absorbing radiation (radiant heat energy) and transferring thermal energy to build material in contact with the fusing agent. This may cause the build material to fuse (also known as sinter). Fusing agent may be ejected onto a layer of build material in a pattern corresponding to or based on a slice of a three-dimensional object, and the layer may be exposed to radiation to selectively fuse the build material to which fusing agent has been applied to form a slice of the object.

Additive manufacturing systems may generate objects based on structural design data. This may involve a designer generating a three-dimensional model of an object to be generated, for example using a computer aided design (CAD) application. The model may define the solid portions of the object. To generate a three-dimensional object from the model using an additive manufacturing system, the model data can be processed to generate slices of parallel planes of the model. Each slice may define a portion of a respective layer of build material that is to be solidified or caused to coalesce by the additive manufacturing system.

A print device for additive manufacture may either receive model data relating to pre-generated slices for forming in layers, or may receive data relating to a three-dimensional model, which is then processed within the print device to generate slices, which are then formed in layers.

The applicant has found that additive manufacturing processes may result in unintended fusing around the boundary of an object. In particular, the applicant has found that additive manufacturing processes which apply heat to build material in order to cause selective fusing may result in unintended fusing owing to thermal conduction from a fused area. Previously considered additive manufacturing processes have focused on applying an agent to prevent fusing in regions around the boundary of an object where unintended fusing may occur.

The example methods, apparatus and objects described herein relate to additive manufacture of an object to include a shield feature (or thermal shield) embedded in the object which may act as a heat sink for thermal conduction from a core of the object, thereby preventing unintended fusing around the boundary of an object. As will be described in detail below, fusing agent may be omitted or applied in a lower concentration on the shield feature so that relatively less heat is transferred to the corresponding build material during radiation exposure, compared with heat transfer to an adjacent portion of the object. Additionally or alternatively, a fusing reduction agent may be applied on the shield feature to either cool the build material corresponding to the shield feature, or inhibit heat transfer thereto during radiation exposure. Any elevation in the temperature of build material corresponding to the shield feature during radiation exposure may be comparatively less than that experienced by build material corresponding to adjacent portions of the object, which may fuse. Excess heat generated in such an adjacent portion may be transferred to build material corresponding to the shield feature by conduction, which may cause the build material to fuse. The shield feature may inhibit such heat transfer to a peripheral portion of the object, thereby inhibiting unintended fusing around the boundary of the object and serving as a heat sink. The shield feature may comprise a shield layer of the three-dimensional object. The shield feature may comprise a shield region defined by a pattern in which no agent (i.e. no fusing agent and no fusing reduction agent) is ejected on build material corresponding to a slice of the object.

FIG. 1 schematically shows an example additive manufacturing apparatus 100 comprising a print bed 102, and a print agent distributor 104. In this example, the print bed 102 has a flat upper surface to receive a layer of build material 50, and may be moveable along a downward direction during an additive manufacturing process so that additional layers of build material can be accommodated. The print agent distributor 104 is coupled to a source of print agent and is moveable over the print bed 102 for selectively ejecting the print agent onto the layer of build material 50 received thereon. In this example, the print agent distributor is an inkjet print head to selectively eject the print agent. The particular print head shown is a scanning printhead to traverse across the print bed 102 along two directions. In other examples, the print agent distributor may be a wide-array print head, or an array of printheads, sized to correspond to a first lateral dimension of the print bed 102, and provided with an actuator for moving the wide-array print head in an orthogonal lateral direction over the print bed 102. A wide-array print head may have more nozzles than a scanning print head, but may allow a faster print operation.

The additive manufacturing apparatus 100 further comprises a controller 110. In use, the controller 110 controls the print agent distributor 104 based on print data to selectively distribute print agent onto build material on the print bed 102, such as a fusing agent. When exposed to radiant heat, the build material is selectively fused, as will be described in detail below.

In FIG. 1, an example layer of build material 50 is shown as received on the print bed 102 for illustrative purposes. The example layer of build material 50 is shown including a pattern of print agent defining an object zone 52 corresponding to a slice of an object to be manufactured. The pattern and object zone 52 defines a slice boundary 54, a shield region 56 offset from and inset within the slice boundary 54 (i.e. so as to be embedded in the object), a shell region 58 between the slice boundary 54 and the shield region 56 (i.e. extending from the shield region 56 and terminating at the slice boundary 54), and a core region 60 within the shield region (i.e. on the other side of the shield region 56 from the shell region 58). The object zone 52 and respective regions will be described in further detail below. In this example, the print bed 102 (and thereby the layer of build material 50) is oriented laterally. The lateral plane is referred to herein as the XY plane, and first and second orthogonal lateral directions (X and Y directions) lie in the plane.

Figure 2:
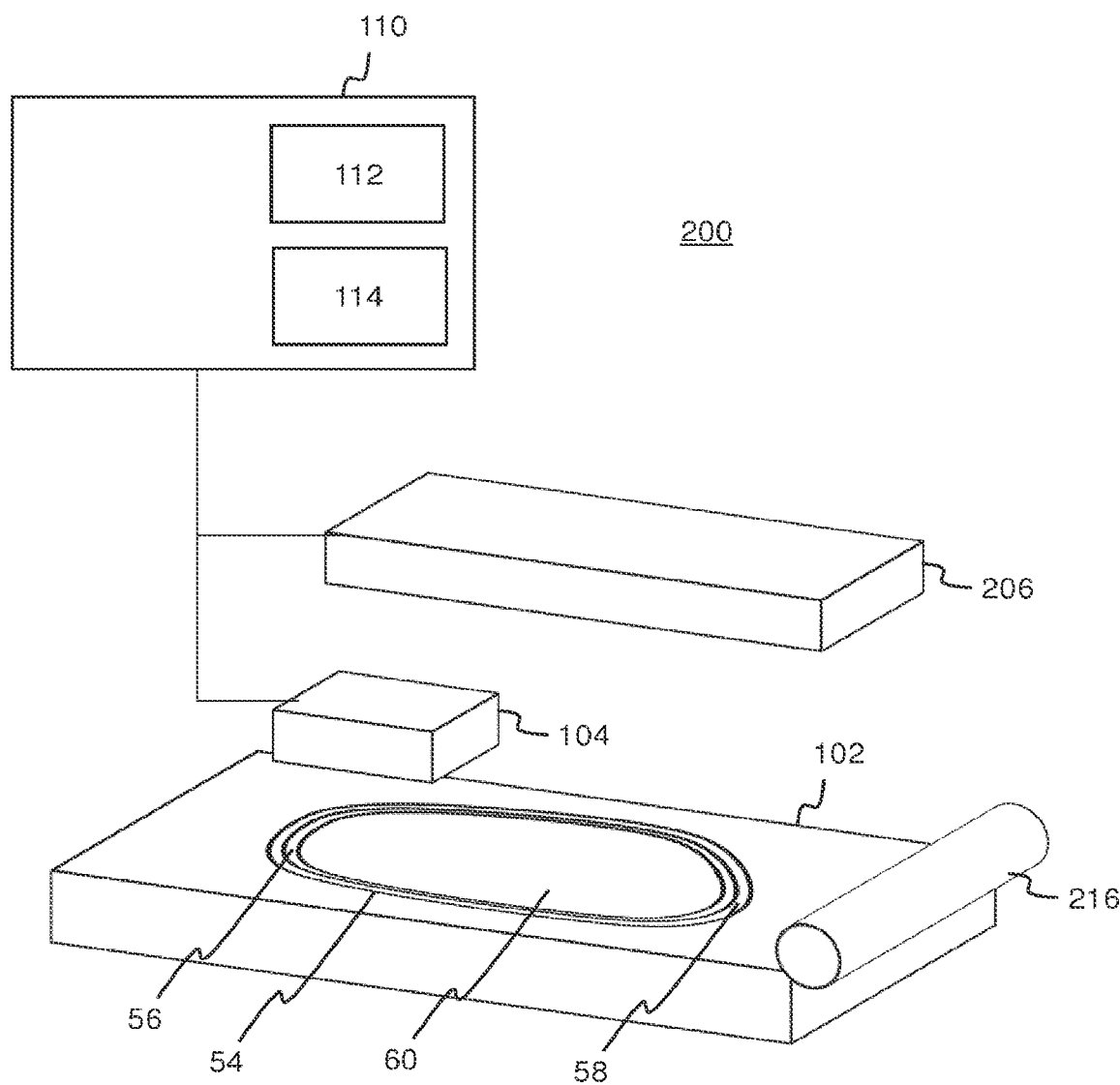
FIG. 2 is a simplified schematic view of a further example additive manufacturing apparatus.

FIG. 2 schematically shows a further additive manufacturing apparatus 200. The apparatus 200 differs from the apparatus 100 described with respect to FIG. 1 in that it additionally comprises a radiation source (or heat lamp) 206 and an applicator roller 216 moveable over the print bed to apply successive layers of build material from a build supply onto the print bed 102. In this example, the print bed 102 is to move downwards (i.e. in a stack-wise direction (or Z direction) so that the plurality of layers can be stacked in a vertical, or stack-wise, or Z direction.

In this example, the radiation source 206 is disposed at a level above the print bed 102 and is to selectively emit radiant heat onto the print bed 102 (or a layer of build material and print agent received thereon). In this particular example, the radiation source 206 is an infrared heat lamp. In use, the controller controls the radiation source 206 to activate to result in the selective fusing of build material, as will be described in detail below. The controller comprises a processor 112 to execute machine-readable instructions and a memory 114 to store machine-readable instructions which, when executed, cause the controller to carry out a method of additive manufacture, as described below. The memory 114 may store print data for additive manufacture of an object including a shield feature. The print data may be received in the memory 114, or may be defined by the controller 110 based on object data relating to the object, so as to include the shield feature, as will be described in detail below.

It will be appreciated that the additive manufacturing apparatus may further comprise additional components. For example, the additive manufacturing apparatus may comprise a casing housing the above components, there may be a supply of build material, and there may be a heater for pre-heating the build material. Further, it will be appreciated that the controller 110 may additionally control other functions of the apparatus 100, for example, any movement of the print bed 102.

Figure 3:
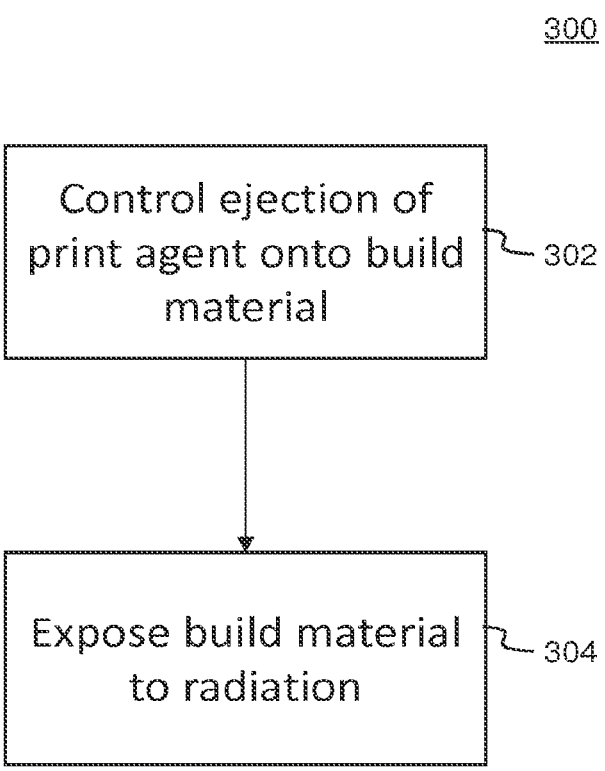
FIG. 3 is a flowchart of an example method of additive manufacture.

FIG. 3 is a flowchart setting out an example of a method 300 of additive manufacture. The method will be described by reference to the apparatus and layer of build material shown in FIG. 2, for illustrative purposes. In block 302, the print agent distributor 104 is controlled by the controller 110 based on print data to eject print agent onto a layer of build material 50 formed on the print bed 102. In this example, each layer of build material is approximately 100 μm (micron) thick as applied on the print bed 102 before fusing. The build material may comprise a distribution of different particle sizes, for example between 20 μm and 100 μm, for example having an average particle size of around 50 μm. In this particular example, the print agent distributor 104 distributes a print agent which is a fusing agent selected to transfer radiant heat received from the radiation source to the build material on which it is ejected/applied. For example, the fusing agent may be a thermally-conductive agent, such as a printing liquid, for example a fluid-based agent or ink based on carbon black pigments (for example, a formulation known as CM997A available from HP Inc.). Such fusing agents may be dark in shade (for example, substantially black). By selectively applying a fusing agent to a layer of build material, the build material can be caused to fuse in those regions where fusing agent is applied (or ejected) in response to a uniform radiant heat received on the layer of build material, such as from a radiation source 206 (e.g. a heat lamp).

The fusing agent is ejected to result in selective fusing of build material to generate a three-dimensional (3D object) in a layer-wise manner (after exposure to radiation), as will be described in detail below. In this example, the print agent distributor 104 is controlled based on the print data so that the fusing agent is ejected onto a layer of build material 50 in a pattern to define an object zone 52 corresponding to a slice of the object to be formed. In particular, the print agent distributor 104 is controlled so that the object zone 52 includes: a slice boundary 54 corresponding to a surface of the object; a shield region 56 within the slice boundary 54; a shell region 58 extending from one side of the shield region 56 and terminating at the slice boundary 54; and a core region 60 disposed on the other side of the shield region 56. Accordingly, as shown in FIGS. 1 and 2, the shell region 58 is adjacent the boundary of the slice, the shield region 56 is within the shell region 58, and the core region 60 is within the shield region 56.

The shield region 56 is distinguished from the shell region 58 in that the print agent distributor 104 is controlled based on the print data to distribute a print agent (which may be a fusing agent and/or a fusing reduction agent) to inhibit fusing of build material in the shield region 56 in response to direct radiation, relative to build material in the shell region 58 and the core region 60. In other words, the print agent is distributed so that build material in the shield region 56 reaches a lower temperature than build material in the core region 60 in response to direct radiation 60, for example, owing to relatively limited transfer of radiant heat via the print agent to the shield region 58, or cooling of the shield region 58 by the print agent (such as a fusing reduction agent). In this particular example, the print agent distributor 104 is controlled based on the print data to distribute a print agent which is a fusing agent, and does not distribute a fusing reduction agent. The print agent distributor 104 is controlled based on the print data so that the fusing agent is applied in the shell region and the core region, but no fusing agent is applied in the shield region.

In block 304, the build material is exposed to radiation, for example, from the radiation source 206, to result in selective fusing of the build material in regions where fusing agent is applied. In this example, the fusing agent is applied in the shell region 58 and the core region 60 at or above a threshold concentration. The threshold concentration is a concentration of fusing agent at which build material to which the fusing agent is applied will fuse in response to a predetermined level of radiant heat, and in the absence of heat transfer from an adjacent region of build material in the object zone. For example, the threshold concentration may be approximately 5 ng of fusing agent for every $600^{th}$ of an inch-square cell or region of build material (approximately 5 ng per $mm^2$, after rounding) for an amount of radiant heat corresponding to 2 $J/cm^2$. This particular example corresponds to transverse movement of a 14 inch long (356 mm), 3.5 kW halogen lamp at a transverse velocity of 20 inches per second (508 mm per second) over a layer of build material. In contrast, when a concentration of fusing agent below the threshold concentration is applied to build material, the build material shall not fuse in response to the same predetermined level of radiant heat alone, but may fuse in response to radiant heat in combination with conductive heat transfer from an adjacent region of build material. The threshold concentration may depend on the build material and a preheat temperature of the build material (i.e. the temperature at which the build material is maintained prior to radiant heating from the radiation source 206).

In this particular example, the radiant heat causes the build material in the shell region 58 and the core region 60 to fuse in response to the radiant heat, which is transferred by the fusing agent to the build material, whereas the radiant heat alone is insufficient to cause build material in the shield region 56 to fuse.

The core region 60 therefore increases in temperature relative to the shield region 56, so that there is conductive heat transfer from the core region 60 to the shield region 56. This conductive heat transfer causes a portion of the build material in the shield region 56 to fuse, despite the lack of fusing agent in the shield region 56. For example, 50% of the build material in the shield region 56 may fuse owing to this heat transfer. In other examples, the proportion of build material that fuses in the shield region may be higher or lower. In some examples, all of the build material in the shield region 56 may fuse, whereas in other examples, none of the build material in the shield region 56 may fuse. The print agent distributor may be controlled based on the print data to define a shield region at least part of which does not fuse in response to radiant heat and thermal conduction from the core region, so that it remains partly unfused in the manufactured object.

It will be appreciated that the shield region 56 insulates (or "shields") the shell region 58 from an excess temperature increase in the core region 60 which may arise, and may therefore be referred to as a thermal shield or a heat sink. An excess temperature in the core region may particularly arise when the core region has a relatively high ratio of surface area to perimeter length. For example, a circular core region would have the highest possible ratio of surface area to perimeter length, whereas a high aspect ratio rectangular core region would have a lower ratio of surface area to perimeter length. The surface area of the core region is proportional to the heat transfer to the core region from a radiation source (as transferred by the fusing agent), whereas the conductive heat transfer from the core region through its perimeter to the shield region is inversely proportional to the perimeter length. Therefore, a slice having a circular geometry may be particularly susceptible to excess heat generation causing unintended fusing around the slice boundary.

Since the shield region 56 insulates the shell region 58 from heat transfer resulting from an excess temperature increase within the core region 60, the shell region 58 is fused without significant unintended fusing owing to conductive heat transfer. In contrast, without the shield region 56, there may be conductive heat transfer from within the slice boundary 54 to build material at the periphery of the slice boundary and beyond the slice boundary, which may cause unintended fusing of build material surrounding the slice boundary.

Although no fusing agent is applied in the shield region 56 in this example, the shield region 56 is still defined by the pattern in which build material is applied, and still within the object zone 52. In particular, it lies within the slice boundary 54 of the object zone 52 (and thereby corresponds to a part of the object to be manufactured), and is delineated by the shell region 58 and the core region 60. In contrast, unfused build material outside of the slice boundary 54 does not correspond to the object to be manufactured.

In other examples, fusing agent may be applied in the shield region 56. For example, fusing agent may be applied in the shield region 56 at the same or a similar concentration to the fusing agent applied in the shell region 58 and the core region 60, and the print agent distributor 104 may be controlled based on the print data to eject a fusing reduction agent onto the shield region 56, with the effect that the shield region 56 serves to absorb excess heat transferred from the core region, without transferring on significant excess heat to the shell region 58. For example, fusing reduction agent may have the effect of cooling build material within the shield region 56, or reducing its thermal conductivity. In an example, the fusing reduction agent may be water at a temperature below a fusing temperature of the build material. The shield region (or shield layer, shield feature) may therefore serve as a heat sink.

In this example, a layer of unfused build material may have a thickness of approximately 100 μm. Fused regions of the layer of build material 50 are consolidated (i.e. re-form) to a thickness of approximately 50 μm.

Figure 4:
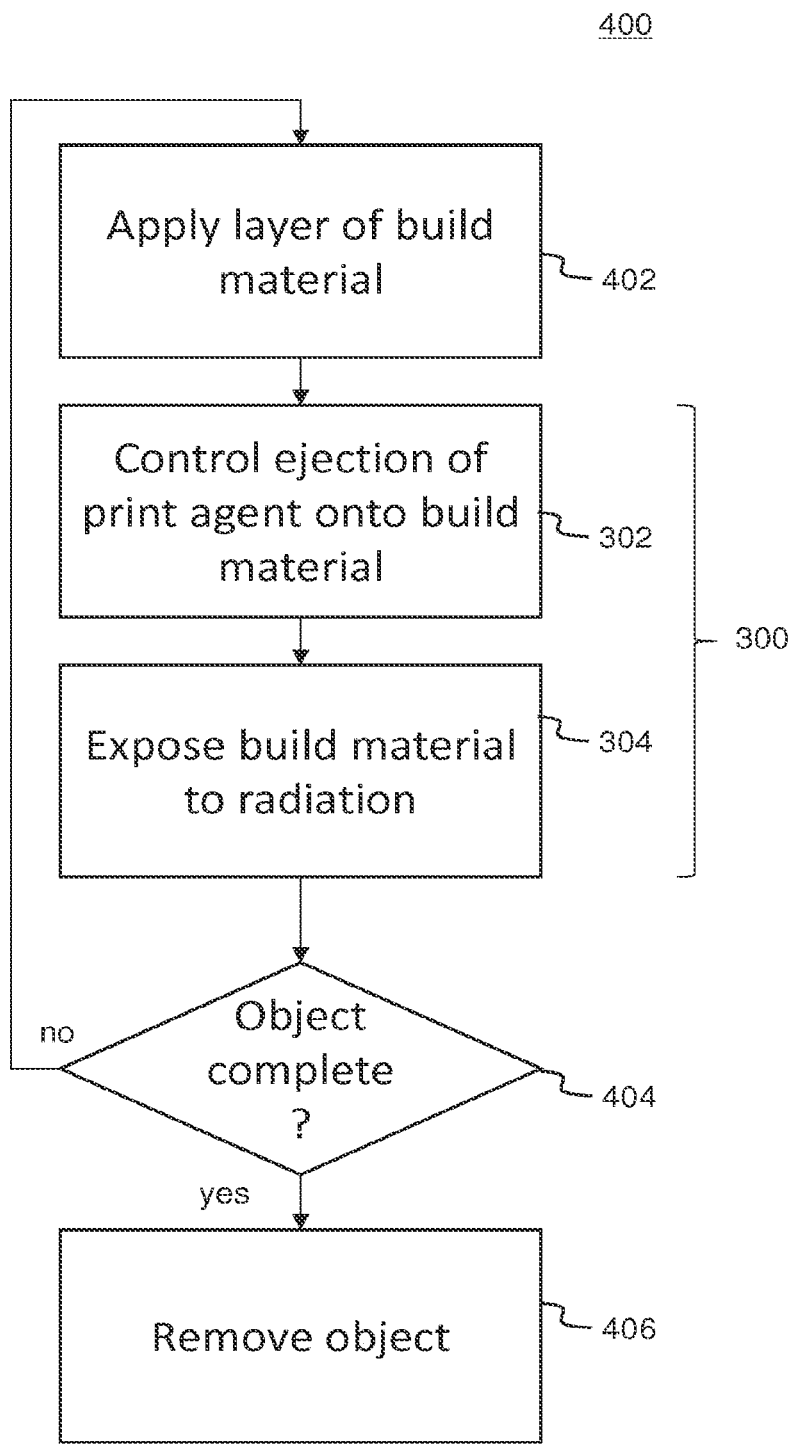
FIG. 4 is a flowchart of a further example method of additive manufacture.

FIG. 4 is a flowchart showing a method of additive manufacture 400 for the selective fusing of multiple layers of build material corresponding to slices of an object, incorporating the above-described method 300 for each layer. In block 402, a layer of build material (for example, a layer having an average thickness of approximately 100 μm) is applied on the print bed 102 (or in subsequent repetitions of block 402, over a previous layer of build material), for example by an applicator roller 216. In block 302, the print agent distributor 104 is controlled based on print data to selectively eject print agent onto build material to define an object zone 52 corresponding to the respective slice of the object, as described above. In block 304, the radiation source 206 is controlled to apply radiant heat onto the layer of build material 50, as described above, to result in the selective fusing of the build material.

In block 404, it is determined, for example by the controller 110 of the additive manufacturing apparatus 200, whether the current layer of build material 50 that has been fused is the final layer of build material to be selectively fused to form the object (i.e. the layer of build material corresponding to the final slice of the object). If it is not the final layer, the method 400 repeats at block 402, and a further layer of build material 50 corresponding to the next successive slice of the object to be manufactured is applied over the previously-fused layer of build material. If the current layer is determined to be the final layer of the build material (i.e. corresponding to the final slice of the object), then the method progresses to block 406, in which an object formed by a plurality of fused layers of build material is allowed to cool and removed from the apparatus.

Figure 5:
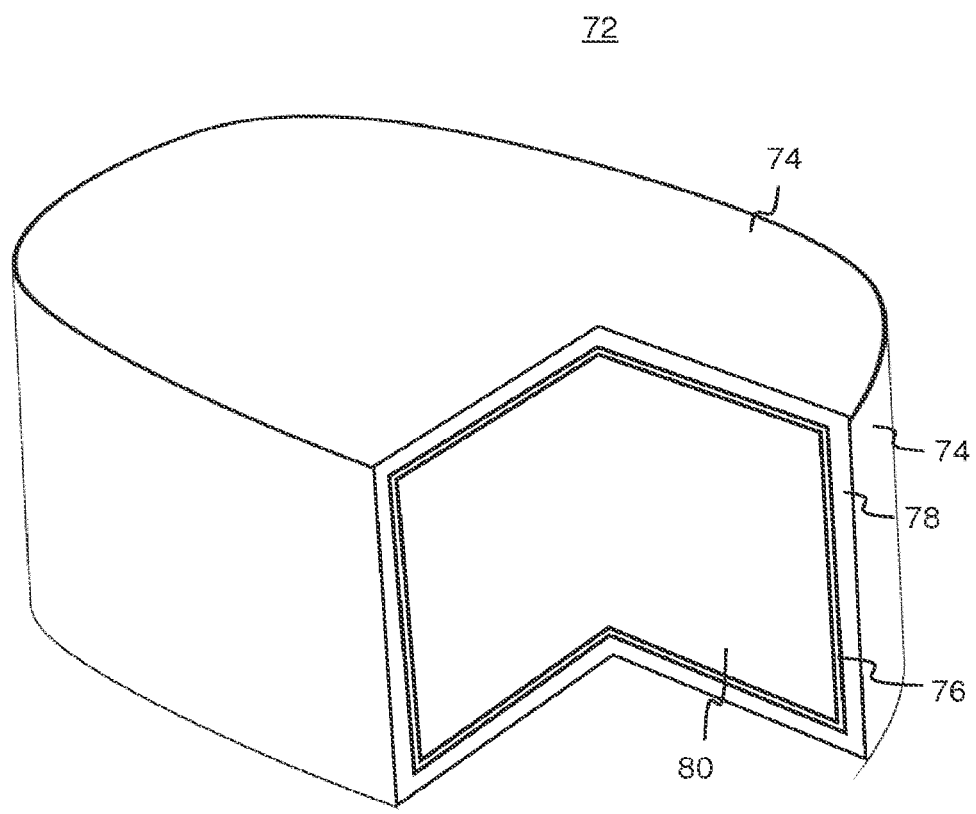
FIG. 5 is a simplified schematic view of an example object made by an example method of additive manufacture.

FIG. 5 shows an example object 72 manufactured according to the additive manufacturing method 400 described above, shown in cutaway view to reveal cut-faces of the interior of the object. The object 72 shown in FIG. 5 is simplified for the purposes of the present disclosure, however it can be seen that the exterior profile of the object generally corresponds to the profile of the object zone 52 shown in FIGS. 1 and 2.

As shown in FIG. 5, the object 72 has a generally uniform lateral cross-section (i.e. in the XY plane), which in this example is constant through stacks of fused build material successively applied in a stack-wise direction (i.e. the Z direction or a vertical direction in the present example). The object has a boundary surface 74, a shield layer 76 offset from the boundary surface 74 within the boundary surface 74, a shell region 78 extending from the shield layer 76 and terminating at the boundary surface 74, and a core 80 within the shield layer 76.

In this example, the object is solid, so that there are no interior cavities within the surface boundary 74. However, in other examples, there may be one or more cavities or openings, which would have corresponding surface boundaries, and shield regions defined therewithin.

As shown in FIG. 5, the thickness of the shell layer 78 (i.e. it's extent into the object from the surface boundary 74) is generally uniform, as is the thickness of the shield layer 76. The thickness of the shield layer 76 may be less than the thickness of the shell layer 78. In this example, the shield layer 76 has a profile corresponding to the profile of the surface 74, inset from the surface 74. The shield layer 76 may be considered to be in the form of a ring or line following the profile of the surface, beneath the surface and separated from it by the shell layer 78. As shown in FIG. 5, the shield layer 76 is offset from the surface 74 along the normal direction to the surface 74, so that the shield layer does not extend up to and terminate at an upper (i.e. stackwise) surface of the object. The shield layer is enclosed or embedded in the object, with the shell layer.

In this particular example, the object has a lateral extent in a first lateral direction (an X direction) of approximately 35 mm, a lateral extent in a second lateral direction (a Y direction) of approximately 30 mm, and a stack-wise extent in a vertical direction (a Z direction or stack direction) of approximately 20 mm. In this particular example, the shell layer 78 is approximately 600 μm thick, whereas the shield layer 76 is approximately 100 μm thick.

In this example, the core 80 and shell layer 78 are completely fused, and the shield layer 76 is also completely fused. Respective shield regions of the shield layer 76 (i.e. regions of layers of build material corresponding to the shield layer) will have fused at least partly owing to thermal conduction from adjacent core regions of build material, as described above. However, the shield layer 76 is distinguishable from the shell layer 78 and the core 80 in that it has a different concentration of a print agent (i.e. a fusing agent and/or a fusing reduction agent). In this example, no fusing reduction agent or fusing agent is applied to build material corresponding to the shield layer 76, whereas fusing agent is applied to build material corresponding to the shell layer 58 and the core 80. Accordingly, the concentration of fusing agent in the shield layer 76 is less than that in the shell layer 78 and in the core 80 (i.e. zero concentration, in this example). This may be visually distinguishable in a cutaway portion of the object 72 as shown in FIG. 5. In particular, where the fusing agent has a shade or colour different from the build material (e.g. black ink), the fused build material forming the shell layer 78 and core region 80 will appear different from the fused build material forming the shield layer 76. For example, the shield layer 76 may be lighter in shade than the shell layer 78 and the core region 80. In other examples, the shield layer 76 may not be visually distinguishable, but may be distinguished by examining the composition of the respective layers.

In another example, fusing agent may be applied to the build material corresponding to the shield layer 76, but in a lower concentration than fusing agent in the shell layer 78 and the core 80. In a further example, fusing agent may be applied to the build material corresponding to the shield layer 76, but a fusing reduction agent may be applied, as described above. The fusing reduction agent may leave a residue in the shield layer 76, which may be determined visually and/or by examination of the material composition of the component 72.

In the above example methods 300, 400 described above, the controller 110 of the additive manufacturing apparatus 100, 200 may receive print data corresponding to the object to be manufactured, which print data includes definitions for a shield feature corresponding to the shield regions 56 of each slice (or the shield layer 76). For example, the print data as received may define pre-generated slices which already incorporate a virtual shield region, virtual shell region and virtual core region. In other words, a shield region may be defined in the object data for each slice before the object data is received at the additive manufacturing apparatus 100, 200. In other examples, the object data may be received in the form of three-dimensional print data from which slices are generated by the controller 110 of the additive manufacturing apparatus 100, 200. The three-dimensional print data may be received including a virtual shell layer, virtual shield layer and virtual core corresponding to a shell layer, shield layer and core of the object to be manufactured. In other words, the shield layer may be implemented in a three-dimensional model, for example in CAD software, before sending object data based on the three-dimensional to the additive manufacturing apparatus 100.

In other examples, the print data including definitions for the shield feature may be defined, for example by the controller 110, based on object data corresponding to the object to be manufactured, wherein the object data is received without definitions for the shield feature.

In a particular example, the controller 110 of the additive manufacturing apparatus may be to receive object data relating to the object to be generated, and to define print data for additive manufacture of the object by ejection of a print agent on build material in a pattern corresponding to selective fusing of the build material. The print data may be defined based on the object data so that the pattern defines a shield feature embedded within the object to inhibit fusing of build material corresponding to the shield feature relative build material corresponding to an adjacent portion of the object. The controller may be to define the print data so that the pattern and shield feature which is defined have any of the features as described herein, for example, relating to the relative location of the shield feature (e.g. the shield regions of the respective slices, and the shield layer of the object), the concentration and type of print agent.

Figure 6:
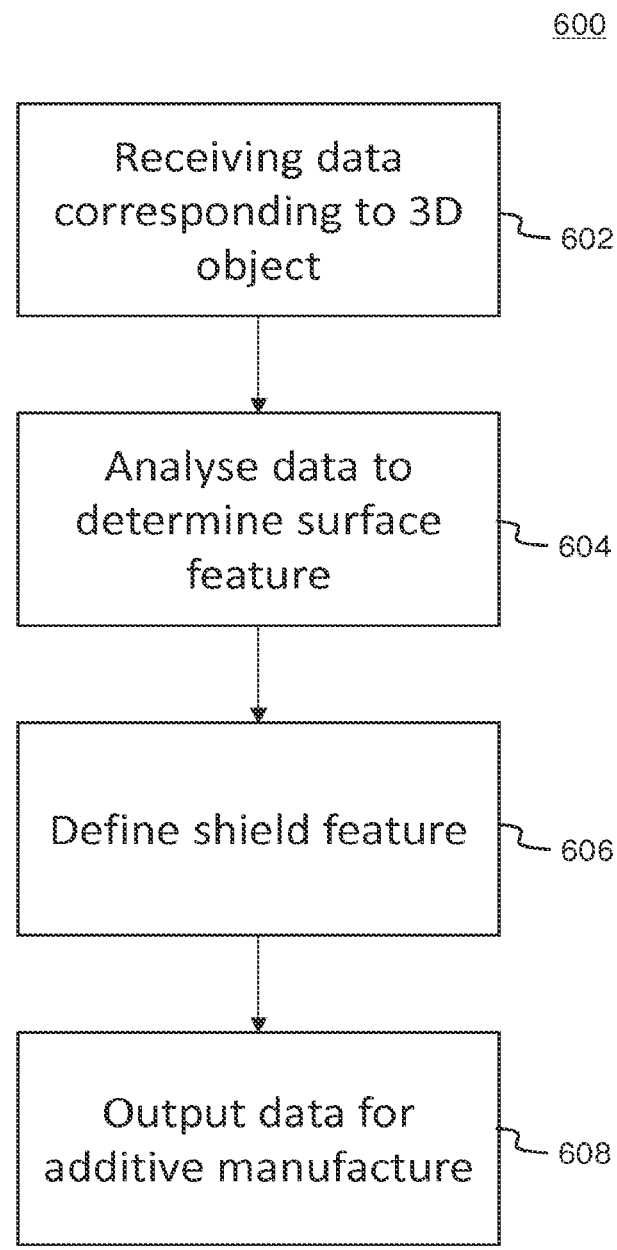
FIG. 6 is a flowchart of an example method of processing object data.

FIG. 6 shows a flowchart for an example method 600 in which print data is defined based on object data to define a shield feature, for example by the controller 110.

In block 602, object data corresponding to a three-dimensional object to be generated in a layer-wise manner is received by a processor. In this particular example, the object data corresponds to pre-generated slices of the object to be manufactured, without any definition of a shield feature.

In block 604, the object data is analysed, by the processor, to determine a surface feature of the object. In this particular example, the object data is initially analysed slice by slice (i.e. virtual slices of the object), as will be described in more detail below with respect to FIGS. 8 and 9. For each virtual slice, a surface feature in the form of a virtual slice boundary is determined, which corresponds to the perimeter of a slice of an object for additive manufacture.

In block 606, the shield feature is defined based on the surface feature. In this example (as will be described in more detail below), a virtual shield region is defined within the virtual surface boundary for a plurality of slices of the object.

Figure 7:
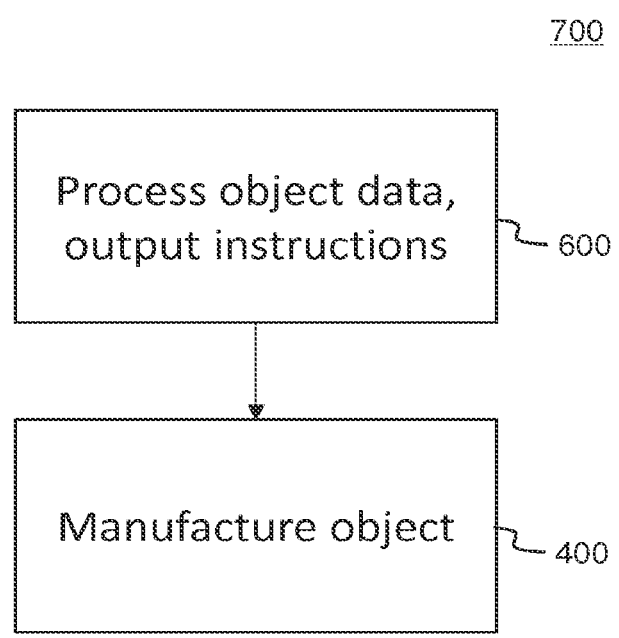
FIG. 7 is a flowchart of an example method of additive manufacture.

In block 608, print data is output for additive manufacture of the object. In this example, the print data is output in the form of slice instructions for the generation of the object. The slice instructions may comprise a plurality of two-dimensional slices including the shield feature. The instructions may otherwise comprise three-dimensional model data including the shield feature. In examples, the instructions may include instructions for controlling the application of a print agent to inhibit (or reduce, or retard) fusing of build material corresponding to the shield feature relative an adjacent portion of build material, for example, by ejecting a lower concentration of fusing agent on a shield region relative adjacent regions of a slice (e.g. the core region and shell region), or by ejecting a fusing reduction agent on the shield region as described above. In other examples, the print data may omit specific instructions relating to the concentration or type of print agent (e.g. a fusing agent or a fusing reduction agent), for example, the shield region(s) or shield feature may be represented as a non-solid region in the print data, and a controller of additive manufacturing apparatus may determine an appropriate distribution of print agent accordingly. The print data may be used in a method of additive manufacture, such as the above-described methods 300, 400, as shown in FIG. 7. FIG. 7 shows a flow chart for a method of additive manufacture 700. In block 600, object data corresponding to an object to be manufactured is processed to define a shield feature and output print data for additive manufacture, as described above with respect to FIG. 6. In block 400, the object is manufactured based on the print data, for example using the apparatus 200 described above with respect to FIG. 2. In particular, the object data may be processed in block 600 by the controller 110 (in particular by the processor 112) of the additive manufacturing apparatus. In particular, the object data may be processed to define print data as described above based on machine-readable instructions stored in the memory 114 of the controller 110, and using the processor 112 of the controller 110. The object data may be processed by a processor remote from the apparatus 200.

It will be appreciated that in examples, the method 600 may be conducted in isolation from an additive manufacturing method. For example, print data may be defined using computer software to modify object data (e.g. 3D model data), separate from an additive manufacturing process.

Figure 8:
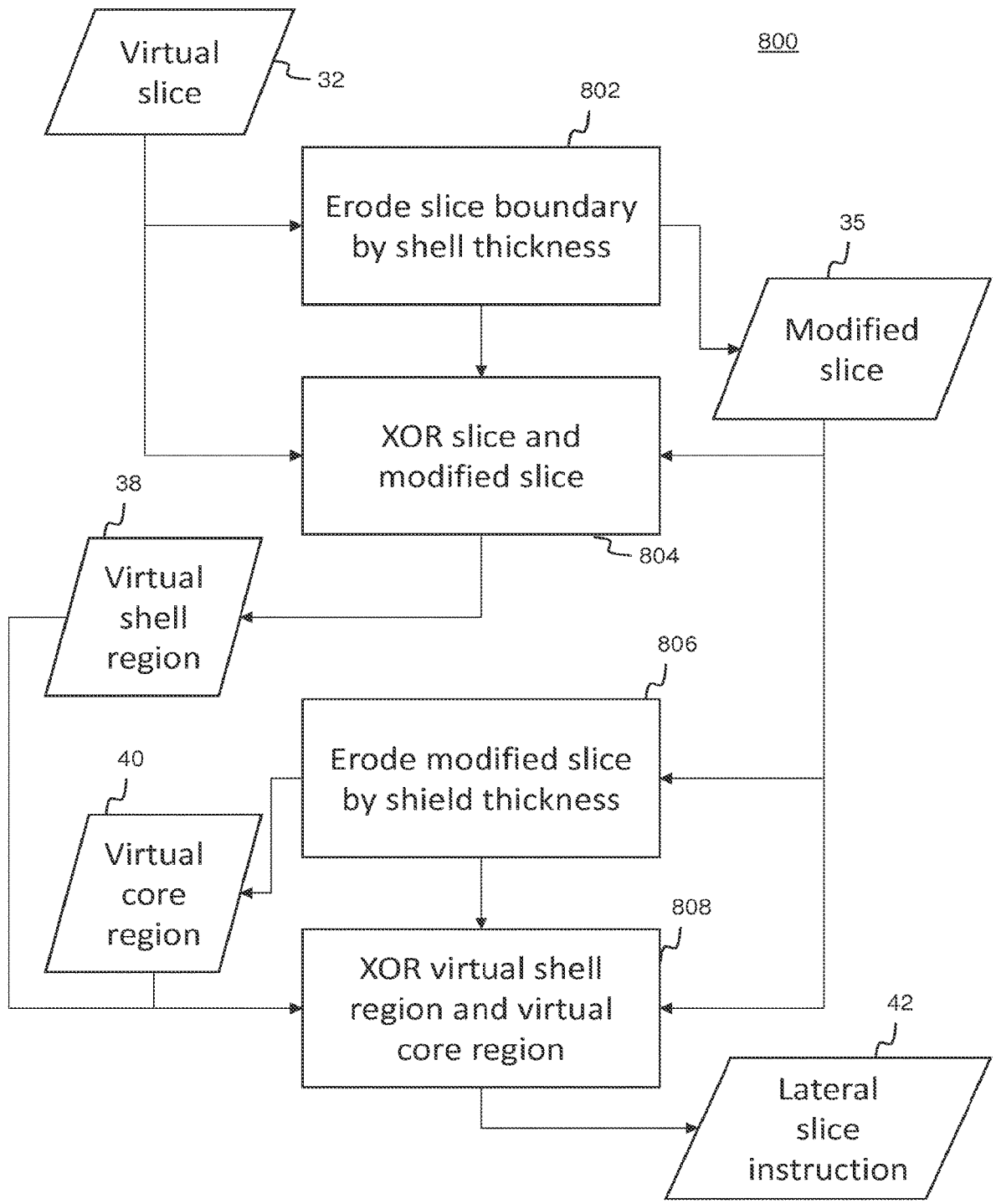
FIG. 8 is a flowchart of an example sub-method of defining a shield feature.

In this example, defining a shield feature (block 606 of FIG. 6) includes a sub-method of defining a shield feature for a plurality of slices of an object. FIG. 8 shows a flowchart for a sub-method 800 of defining a shield feature for a slice of an object. In this example, the object data corresponds to pre-generated slices corresponding to slices of the object to be manufactured, or is processed to generate the respective slices. As described with respect to method 600 of FIG. 6 above, for each of a plurality of slices, a surface feature is determined, and the shield feature is defined based on the surface feature. In this example, the surface feature is determined as a virtual slice boundary of a virtual slice (i.e. in block 604 of FIG. 6).

The method of FIG. 8 will be described with respect to a series of virtual geometric definitions as shown in FIGS. 9A to 9E.

In block 802, the virtual slice 32 is received, for example from memory 114 of the controller 110. The virtual slice 32 is defined by a virtual slice boundary 34. In this particular example, the virtual slice 32 comprises a plurality of pixels in a regular matrix, wherein pixels within the virtual slice boundary and corresponding to solid regions of the object have a positive value (e.g. 1) (at least initially). Pixels outside the virtual slice boundary have a zero value. The pixels correspond to the regions of a layer of build material which are to be directly fused by radiant heat transfer (i.e. in the absence of heat transfer from an adjacent region of build material).

Figure 9A:
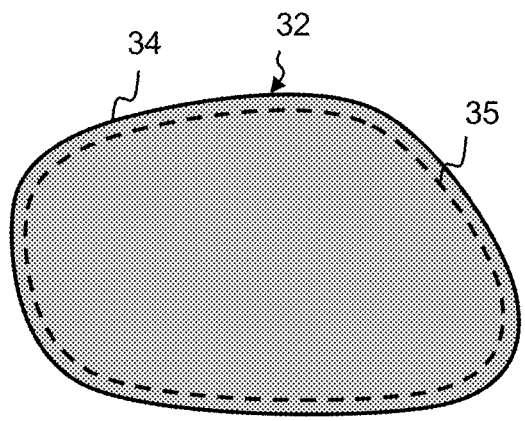
FIGS. 9A-9E are simplified schematics of virtual slice data according to an example.

The virtual slice 32 and virtual slice boundary 34 are shown in FIG. 9A. The virtual slice boundary 34 defines the perimeter of the virtual slice 32 for the object to be generated. The virtual slice 32 is eroded by a shell thickness, for example, a shell thickness of 600 µm, to define a modified slice 35, which may be stored in memory 114. For example, the virtual slice can be eroded by progressively changing the pixel values of the outermost pixels (i.e. those adjacent a zero-value pixel) to zero a predetermined number of times. The perimeter of the modified slice 35 is shown in FIG. 9A.

Figure 9B:
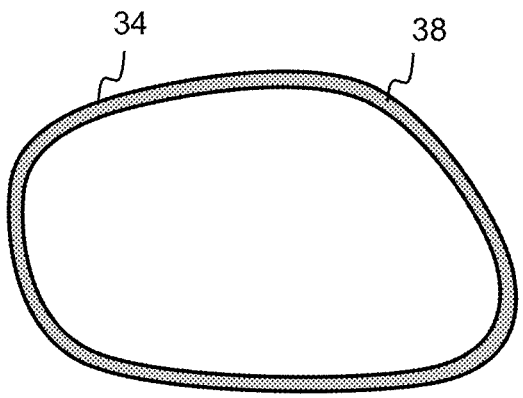

In block 804, an XOR (exclusive OR) logical operation is conducted based on the virtual slice 32 and the modified slice 35 to define a virtual shell region 38. Accordingly, only pixels of the virtual slice 32 which have a zero value in the modified slice 35 are retained. The virtual shell region 38 is stored in memory 114. The virtual shell region 38 is shown in FIG. 9B.

Figure 9C:
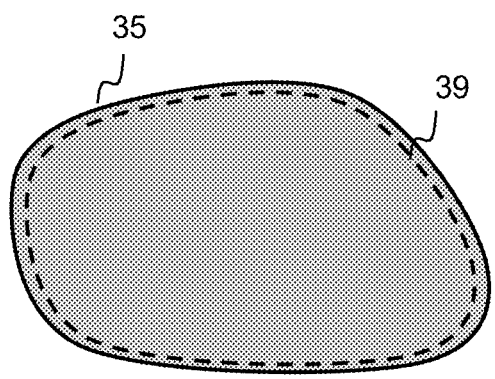
Figure 9D:
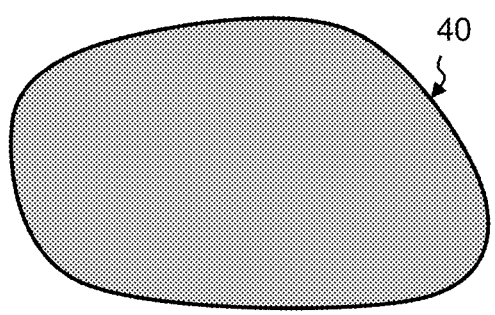

In block 806, the modified slice 35 is eroded once more by a shield thickness, for example, a shield thickness of 100 µm, to define a virtual core region 40. FIG. 9C shows the definition of a perimeter 39 of the core region 40 based on the modified slice 35. FIG. 9D shows the core region 40.

Figure 9E:
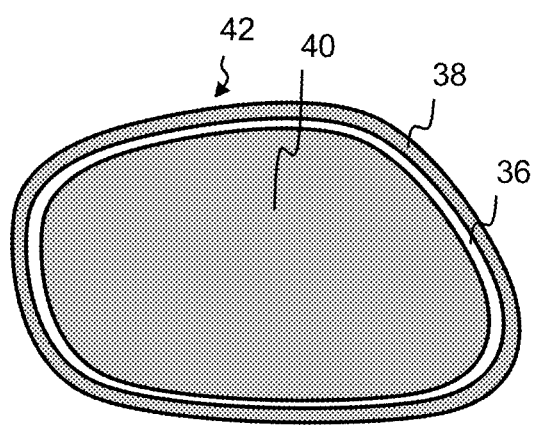

In block 808, a further XOR operation is conducted based on the virtual shell region 38 and the virtual core region 40. Since the non-zero pixels of these two regions do not overlap, the XOR operation combines the two regions to generate a lateral slice instruction 42 including non-zero pixels for the shell region 38 and the core region 40, and zero value pixels in a shield region 36 defined therebetween. The lateral slice instruction is stored in memory 114, and can be used for the selective fusing of build material to form the respective slice, as described above. The lateral slice instruction 42 is shown in FIG. 9E.

It will be appreciated that the above-described method of defining the virtual shield region 36 is conducted for each lateral slice for an object, so that a virtual shield region is defined with respect to a virtual slice boundary lying in a lateral plane (i.e. an XY plane). In examples, instructions for additive manufacture of the object may be determined based on the lateral slice instructions 42 only.

Figure 10:
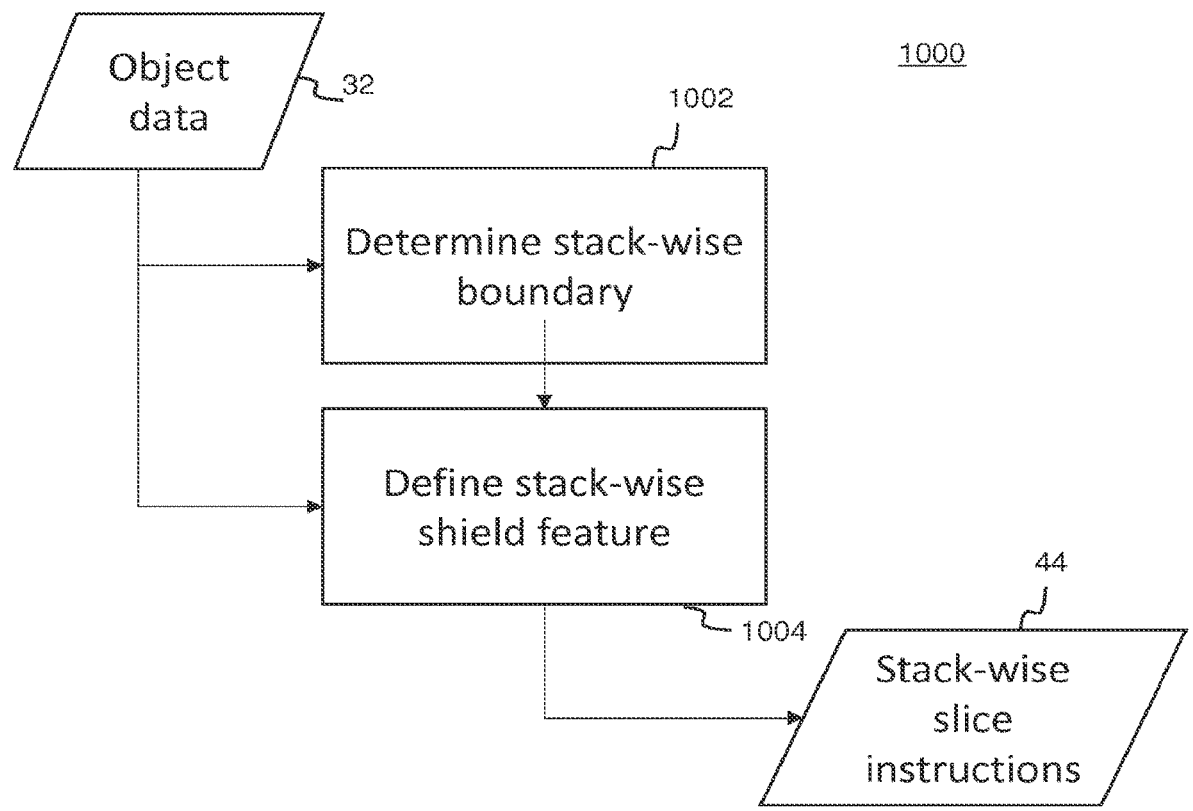
FIG. 10 is a flowchart of an example sub-method of defining a shield feature.

In this example, the definition of the shield feature (block 606 of FIG. 6) further includes a sub-method for defining a shield feature with respect to the stack-wise direction of the object. FIG. 10 shows such an example sub-method 1000. In block 1002, object data 32 corresponding to a plurality of virtual slices 32 is received, for example, from memory 114 of the controller 110.

The object data is analysed to determine stack-wise boundaries for each pixel position of the virtual slices (i.e. boundaries of the stack-wise extent, which in this example corresponds to the vertical direction, Z direction or stack direction). It will be appreciated that each pixel position is represented in each of the plurality of slices. For example, pixel positions for which all of the virtual slices have a zero value do not correspond to the location of the object to be manufactured, and accordingly there is no stack-wise boundary to be determined. Pixel positions for which at least one virtual slice 32 has a non-zero value correspond to the location of the object, and so at least an upper and a lower stack-wise boundary are to be determined. For each such pixel position, a plurality of virtual slices are analysed to determine boundary locations within a stack of the virtual slices 32 wherever there is a change between successive virtual slices from a non-zero value (corresponding to a location of the object) to a zero value. Table 1 below shows pixel values for two pixel positions across a plurality of virtual slices in a simplified example. The virtual slice IDs (i.e. the number of the virtual slice in order) are shown in reverse order, since virtual slice ID 1 corresponds to the lowermost slice. Table 1 shows pixel values for virtual slice IDs 101 to 108 which are at an intermediate location in the stack of virtual slices.

TABLE 1

| Virtual Slice ID | Pixel Position A | Pixel Position B |
|---|---|---|
| 108 | 1 | 0 |
| 107 | 1 | 0 |
| 106 | 1 | 1 |
| 105 | 1 | 1 |
| 104 | 0 | 1 |
| 103 | 0 | 1 |
| 102 | 0 | 1 |
| 101 | 0 | 1 |

In this simplified example, a lower stack-wise boundary is determined in slice 105 at pixel position A, and an upper stack-wise boundary is determined in slice 106 at pixel position B.

In block 1004, a stack-wise shield feature is defined by modifying the virtual slices 32 based on the location of the stack-wise boundaries. In particular, where a lower stack-wise boundary is determined for a particular pixel position, for example pixel position A of Table 1, a stack-wise shield feature is defined at an upper position offset from the lower stack-wise boundary. The stack-wise shield feature is defined based on a shield layer thickness and a shell layer thickness. In this example, the shell layer thickness is 600 µm, the shield layer thickness is 100 µm, and each layer of fused build material is assumed to have a thickness of 50 µm. Therefore, the shell layer thickness corresponds to 12 virtual slices, and the shield layer thickness corresponds to 2 virtual slices. To define the shield feature based on the lower stack-wise boundary, it is first determined whether the pixel values for the respective pixel position is non-zero for a number of virtual slices above the lower stack-wise boundary corresponding to double the shell thickness and a single shield thickness. In this example, this corresponds to 26 virtual slices. If this determination is positive, then the stack-wise feature is defined in the respective slices by modifying the pixel values for the respective layers to zero. In this example, pixel values at pixel position A are modified to zero for virtual slice IDs 117 and 118. The pixels at the particular pixel position for the intervening virtual slices 32, which in this example number twelve, correspond to a stack-wise shell region. In this example the stack-wise shell region is identified by modifying the pixel value from 1 to 2.

Similarly, where an upper stack-wise boundary is determined for a particular pixel position, for example pixel position B of Table 1, a stack-wise shield feature is defined at a lower position offset from the upper stack-wise boundary, based on the shield layer thickness and the shell layer thickness. In this example, a stack-wise shield feature is defined in layers 93 and 94 at pixel position B.

It will be appreciated that the presence of a lower stack-wise boundary at a particular pixel position implies the presence of an upper stack-wise boundary at the same pixel position (elsewhere in the stack of virtual slices). Further, there may be more than one pair of stack-wise boundaries for a pixel position, particularly for a highly curved component, or one comprising cavities.

The modified virtual slices 32 are stored as stack-wise slice instructions 44.

Analysing the virtual slices may comprise analysing a subset of the stack of virtual slices for each pixel position, for example, a number of slices corresponding to double the thickness of the stack-wise shell region (in this example, 24 slices) in addition to the thickness of the stack-wise shield region (in this example, 2 slices). The analysis may be done for each of a plurality of overlapping subsets in turn, to progressively analyse the entire stack, locate the stack-wise boundaries and define the respective shield features. This may reduce the processing burden.

In this example, the data output for additive manufacture of the object in block 608 of FIG. 6 is determined based on both the lateral slice instructions 42 and the stack-wise slice instructions 44. In this particular example, shield features defined in the stack-wise slice instructions 44 are transposed to the core regions of the respective lateral slice instructions 42 (and not to the shell regions of the respective lateral slice instructions). Accordingly, the shell regions of the lateral slice instructions are not modified to include stack-wise shield features. Further, stack-wise shell regions identified in the stack-wise slice instructions 44 (i.e. pixels having a pixel value of 2) are transposed to the lateral slice instructions 42, thereby removing any shield regions defined in the lateral slice instructions 42 in locations corresponding to the stack-wise shell regions.

Print data is then output for additive manufacture of the object based on the modified lateral slice instructions.

In the example method 600 of defining print data, the print data is defined in a slice-by-slice manner, and the print data is defined based on predetermined thicknesses for the shell and shield features (i.e. the thicknesses of the shell region and shield region within the plane of the respective slices, and the thickness in the stack direction where determined relative the stackwise boundaries). It will be appreciated that in other examples, the thicknesses of the shield feature and shell feature may higher or lower, for example, and object having a maximum diameter of 35 mm may have a shield thickness or shell thickness between 50 μm and 1500 μm.

Further, example methods may determine whether or not to define a shield region for a particular slice. For example, criteria may be set to define a shield feature if a characteristic length (e.g. a maximum diameter) or surface area of a core region is above a predetermined threshold (e.g. a length twice the shield thickness), and not define a shield feature when the criteria is not met.

In some examples, the respective thicknesses of a shell layer or shell region (a shell thickness), and a shield layer or shield region (a shield thickness), may be predetermined. In other examples, the respective thicknesses may scale with a characteristic dimension of an object to be generated, such as a maximum diameter of the object. For example, print data may be defined so that an object having a maximum diameter up to 50 mm may have a shell thickness of approximately 600 μm and a shield thickness of approximately 100 μm, whereas for an object having a maximum diameter up to 100 mm the shell thickness may be approximately 1200 μm and the shield thickness may be approximately 200 μm. In examples, the shield thickness may be greater than or equal to the shell thickness.

In other examples, the shield thickness and shell thickness may be determined as a percentage of a characteristic dimension of the object, such as the maximum diameter. For example, a shield thickness or shell thickness may be defined as between 0.1% and 3% of a maximum diameter of an object, for example between 0.2% and 1%, for example between 0.3% and 0.5%.

In other examples, the respective dimensions may be variable, and/or may be determined based on thermal modelling based on the object data. Thermal modelling may include Finite Element Analysis (FEA). The print data may be defined based on a thermal modelling analysis so that the shield feature is of an appropriate size and/or so that an appropriate amount of a print agent (e.g. a fusing agent or a fusing reduction agent) is applied on build material corresponding to the shield feature to inhibit heat transfer from build material corresponding to the core to build material corresponding to the shell (i.e. a shell layer or shell region) through the shield feature. For example, a shield feature may be sized based on determining an amount of excess heat generated during additive manufacture in build material corresponding to the core of the object, and determining a dimension for the shield feature accordingly to serve as a heat sink to inhibit heat transfer from the core to a shell layer of the object.

Example parameters that may be provided for such thermal modelling may include parameters relating to a build material, fusing agent, fusing reduction agent, additive manufacturing apparatus and geometry of the object to be manufactured in an additive manufacturing operation. For example, such parameters may include a thermal conductivity of build material (as fused and unfused), a pre-heat temperature for build material, a fusing temperature of build material, a temperature of a fusing agent and/or a fusing reduction agent as applied, a radiant heat transfer property of the fusing agent and/or fusing reduction agent, specific heat properties of the build material, fusing agent and/or fusing reduction agent, a radiant heat to which each layer of build material is to be exposed, a time interval between fusing successive layers of build material, and a time interval between applying print agent and exposure of the print agent to radiation. A thermal model may model thermal conduction (diffusion) within a respective slice of an object and thermal conduction between slices. Such parameters may be predetermined and may be provided from a database, for example a database stored in a memory of a controller of additive manufacturing apparatus, or a remote database.

A dimension of a shield feature (e.g. a thickness dimension within the plane of a slice) may vary between locations within an object, including at different locations on a respective slice.

Thermal modelling as described above may also be employed to determine an amount or concentration of a print agent (e.g. a fusing agent and/or a fusing reduction agent) to be applied to build material corresponding to a shield feature.

A controller, such as a controller of additive manufacturing apparatus, may be to conduct a thermal modelling analysis based on object data, and define print data based on the thermal modelling analysis. In other examples, a remote processor, for example a processor of a remote computer (i.e. remote from additive manufacturing apparatus) may be to define print data based on a thermal analysis and/or conduct a thermal analysis for the definition of print data by a separate controller.

Figure 11:
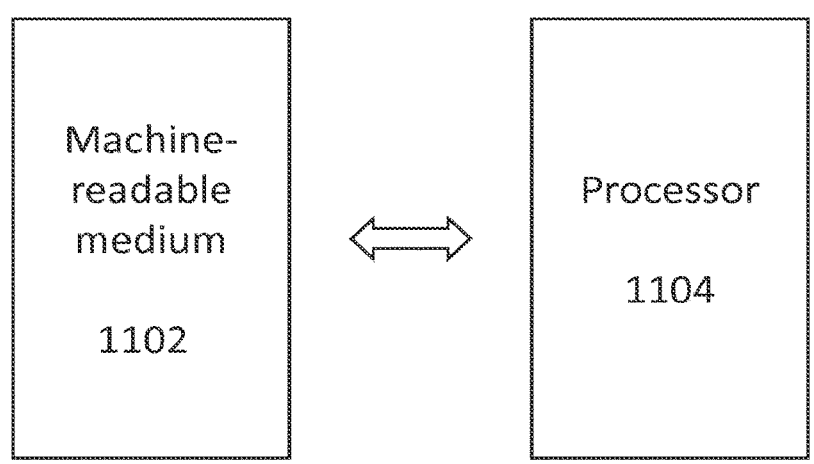
FIG. 11 is a simplified schematic view of example machine-readable instructions and a processor.

FIG. 11 shows a non-transitory machine-readable medium 1102 encoded with instructions executable by a processor 1104. In an example, the instructions include instructions to receive object data corresponding to a three-dimensional object and to define a virtual shield feature embedded within the object. The instructions may include instructions to define print data for additive manufacture of the object by the ejection of a print agent on build material in a pattern corresponding to selective fusing of the build material, wherein the print data is defined so that the pattern defines a shield feature corresponding to the virtual shield feature to inhibit fusing of build material corresponding to the shield feature relative build material corresponding to an adjacent portion of the object.

For example, the instructions may comprise instructions to carry out the method 600 described above with respect to FIG. 6. For example, the instructions comprise instructions to receive the object data (block 602) analyse the object data to determine a surface feature (block 604), define a shield feature (block 606) and output data for additive manufacture of the object (block 608), as described above. In particular, the instructions may comprise instructions to, for each slice of a plurality of virtual slices, define a virtual shell region as described above with respect to FIG. 8. Further, the instructions comprise instructions to define a shield region of at least one slice of a plurality of virtual slices as described above with respect to FIG. 9. Such machine-readable instructions may be included on a machine-readable storage medium (including but not limited to disc storage, CD-ROM, optical storage, etc.) having machine-readable program codes therein or thereon. In other examples, the machine-readable storage medium may be integrated in a controller of additive manufacturing apparatus, for example the instructions may be stored in a non-transitory machine-readable storage medium, such as the memory 114 of the controller 110 of additive manufacturing apparatus 200.

In other examples, the instructions may be to define a three-dimensional virtual shield feature based on a three-dimensional analysis of the object (for example, by defining a virtual shield layer as offset within the three-dimensional surface boundary of the object), rather than a slice-by-slice analysis. Accordingly, a surface feature in the form of a virtual surface of the object may be determined (corresponding to the surface of the object to be manufactured), and the virtual shield layer may be defined based on the virtual surface. Slices, including respecting virtual shield regions, virtual shell regions and virtual core regions, may then be defined based on the modified virtual object.

The instructions may be to conduct a thermal modelling analysis and/or to define the print data based on a thermal modelling analysis, as described above. For example, the instructions may be to define print data so the shield feature is defined based on thermal modelling (for example, so the thickness of the shield feature is defined based on a thermal analysis of excess heat in build material corresponding to a core of an object to be generated).

In examples where fusing reduction agent is applied, the print agent distributor may be controlled to selectively distribute fusing agent and/or fusing reduction agent. In other examples, the print agent distributor may comprise a fusing reduction agent distributor, or a fusing reduction agent distributor may be provided and controlled separately to the print agent distributor.

Examples in the present disclosure can be provided as methods, systems or machine-readable instructions, such as any combination of software, hardware, firmware or the like. Such machine-readable instructions may be included on a machine-readable storage medium (including but is not limited to disc storage, CD-ROM, optical storage, etc.) having machine-readable program codes therein or thereon.

The present disclosure is described with reference to flow charts and/or block diagrams of the method, devices and systems according to examples of the present disclosure. Although the flow diagrams described above show a specific order of execution, the order of execution may differ from that which is depicted. Blocks described in relation to one flow chart may be combined with those of another flow chart. It shall be understood that each flow and/or block in the flow charts and/or block diagrams, as well as combinations of the flows and/or diagrams in the flow charts and/or block diagrams can be realized by machine-readable instructions.

The machine-readable instructions may, for example, be executed by a general purpose computer, a special purpose computer, an embedded processor or processors of other programmable data processing devices to realize the functions described in the description and diagrams. In particular, a processor or processing apparatus may execute the machine-readable instructions. Thus functional modules of the apparatus and devices may be implemented by a processor executing machine-readable instructions stored in a memory, or a processor operating in accordance with instructions embedded in logic circuitry. The term 'processor' is to be interpreted broadly to include a CPU, processing unit, ASIC, logic unit, or programmable gate array etc. The methods and functional modules may all be performed by a single processor or divided amongst several processors.

Such machine-readable instructions may also be stored in a machine-readable storage that can guide the computer or other programmable data processing devices to operate in a specific mode.

Such machine-readable instructions may also be loaded onto a computer or other programmable data processing devices, so that the computer or other programmable data processing devices perform a series of operations to produce computer-implemented processing, thus the instructions executed on the computer or other programmable devices realize functions specified by flow(s) in the flow charts and/or block(s) in the block diagrams.

Further, the teachings herein may be implemented in the form of a computer software product, the computer software product being stored in a storage medium and comprising a plurality of instructions for making a computer device implement the methods recited in the examples of the present disclosure.

While the method, apparatus and related aspects have been described with reference to certain examples, various modifications, changes, omissions, and substitutions can be made without departing from the spirit of the present disclosure. It is intended, therefore, that the method, apparatus and related aspects be limited only by the scope of the following claims and their equivalents. It should be noted that the above-mentioned examples illustrate rather than limit what is described herein, and that those skilled in the art will be able to design many alternative implementations without departing from the scope of the appended claims. Features described in relation to one example may be combined with features of another example.

The word "comprising" does not exclude the presence of elements other than those listed in a claim, "a" or "an" does not exclude a plurality, and a single processor or other unit may fulfil the functions of several units recited in the claims.

The features of any dependent claim may be combined with the features of any of the independent claims or other dependent claims.

The invention claimed is:

1. A method comprising:
controlling a fusing agent distributor of an additive manufacturing apparatus to eject a fusing agent onto build material, wherein a print agent distributor is controlled based on print data so that the fusing agent is ejected in a pattern defining a layer of an object to be formed including a shield feature, on which no fusing agent is ejected, embedded within the object;
exposing the build material to radiation so that an adjacent portion of the object adjacent to the shield feature and including fusing agent is fused and heat is conducted from the adjacent portion of the object to the build material of the shield feature.

2. The method of claim 1, further comprising fusing build material of the shield feature with the heat conducted from the adjacent portion of the object, with radiant heat from radiation source being insufficient to fuse build material of the shield feature.

3. The method of claim 2, wherein the build material of the shield feature is only partially fused by the heat conducted from the adjacent portion of the object.

4. The method of claim 2, wherein no fusing agent is applied to the build material of the shield feature.

5. The method of claim 1, wherein no fusing agent is applied to the build material of the shield feature.

6. The method of claim 1, further comprising, according to the pattern, distributing less of the fusing agent to the shield feature than to other regions of a layer of the build material that are within the object being formed.

7. The method of claim 1, further comprising, according to the pattern, distributing a fusing reduction agent to the shield feature within a layer of the build material, the fusing reduction agent inhibiting fusion of the build material when exposed to fusing radiation.

8. The method of claim 7, wherein the fusing reduction agent is water.

9. The method of claim 1, further comprising, when heating the build material to form the object, using the shield feature as a heat sink to accept heat from a core region of the object that is surrounded by the shield feature, the shield feature being between the core region and an outer surface of the object being formed.

10. The method of claim 1, wherein the shield feature is at a uniform depth within and spaced from an outer surface of the object being formed.

11. Additive manufacturing apparatus comprising:
a controller to:
receive object data relating to an object to be generated;
define print data for additive manufacture of the object by ejection of a fusing agent onto build material in a pattern corresponding a layer of the object to be generated,
wherein the print data is defined based on the object data so that the pattern defines a shield feature embedded within the object, the print data to inhibit fusing of build material corresponding to the shield feature relative to build material corresponding to an adjacent portion of the object, wherein build material of the shield feature receives heat from the adjacent portion of the object; and
a print agent distributor to eject the fusing agent on build material based on the print data.

12. The apparatus of claim 11, wherein the controller is to define the print data so that fusing agent is not applied at the shield feature.

13. The apparatus of claim 11, further comprising a radiation source to activate the fusing agent to fuse build material, wherein the build material of the shield feature is heated by heat conducted from the adjacent portion of the object that absorbs energy from the radiation source.

14. The apparatus of claim 13, wherein the build material of the shield feature is partially fused by the heat from the adjacent portion of the object that receives fusing agent.

15. The apparatus of claim 11, further comprising a radiation source to activate the fusing agent to fuse build material, wherein the controller is to define the print data to inhibit fusing of build material corresponding to the shield feature in response to radiant heat from the radiation source, relative to build material corresponding to a core of the object.

16. Additive manufacturing apparatus comprising:
a controller to:
receive object data relating to an object to be generated;
define print data for additive manufacture of the object by ejection of a fusing agent onto build material in a pattern corresponding a layer of the object to be generated,
wherein the print data is defined to include a shield feature embedded within the object, wherein the shield feature receives less fusing agent than other areas of the build material forming the object so as to inhibit fusing of build material corresponding to the shield feature relative to build material corresponding to an adjacent portions of the object,
wherein build material of the shield feature receives heat conducted from the adjacent portions of the object; and
a print agent distributor to eject the fusing agent on build material based on the print data.

17. The apparatus of claim 16, wherein the controller is to define the print data so that no fusing agent is applied at the shield feature.

18. The apparatus of claim 16, further comprising a radiation source to activate the fusing agent to fuse build material, wherein the build material of the shield feature is heated by heat conducted from the adjacent portion of the object that absorbs radiant energy from the radiation source.

19. The apparatus of claim 18, wherein the build material of the shield feature is partially fused by the heat conducted from the adjacent portion of the object that receives fusing agent.

20. The apparatus of claim 16, wherein the print data includes data for dispensing a fusing reduction agent to the shield feature.

* * * * *